United States Patent
Laredo et al.

(10) Patent No.: US 9,836,534 B2
(45) Date of Patent: Dec. 5, 2017

(54) USING ONTOLOGY TO DISCOVER API REQUIREMENTS

(71) Applicant: International Business Machines Corporation, Armonk, NY (US)

(72) Inventors: Jim A. Laredo, Katonah, NY (US); Sriram K. Rajagopal, Chennai (IN); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 14/340,815

(22) Filed: Jul. 25, 2014

(65) Prior Publication Data

US 2016/0026710 A1 Jan. 28, 2016

(51) Int. Cl.
*G06F 17/30* (2006.01)

(52) U.S. Cl.
CPC .. *G06F 17/30734* (2013.01); *G06F 17/30651* (2013.01); *G06F 17/30663* (2013.01)

(58) Field of Classification Search
None
See application file for complete search history.

(56) References Cited

U.S. PATENT DOCUMENTS

| | | | |
|---|---|---|---|
| 8,484,141 B2 | 7/2013 | Grabarnik et al. | |
| 8,838,618 B1 * | 9/2014 | Wu | G06F 17/30625 707/750 |
| 2003/0172368 A1 * | 9/2003 | Alumbaugh | G06N 5/02 717/106 |
| 2007/0033261 A1 * | 2/2007 | Wagner | G06F 17/30896 709/217 |
| 2009/0204594 A1 * | 8/2009 | Akkiraju | G06F 8/34 |

(Continued)

FOREIGN PATENT DOCUMENTS

| | | |
|---|---|---|
| EP | 2400408 A1 | 12/2011 |
| WO | 2004102925 A1 | 11/2004 |

OTHER PUBLICATIONS

"Data Models," Operational Data Model and Data Warehouse Model, undated, 5 pages, accessed Jul. 24, 2014. https://nrf.com/resources/retail-technology-standards/data-models.

(Continued)

*Primary Examiner* — Aleksandr Kerzhner
*Assistant Examiner* — Eddy Cheung
(74) *Attorney, Agent, or Firm* — Yee & Associates, P.C.; Louis J. Percello

(57) ABSTRACT

An embodiment of the invention is provided for use in discovering a specified API service capability. The embodiment includes generating a search statement related to the specified API service capability. The embodiment further includes constructing a data structure, wherein the data structure includes one or more characteristic nodes that are each associated with data describing a particular API characteristic, and the associated data for respective characteristic nodes is ordered in accordance with one or more API service ontologies. The search statement is used to selectively search the data structure. The embodiment determines whether the search finds a match between data included in the search statement, and particular ontological data associated with one or more of the characteristic nodes of the data structure.

15 Claims, 9 Drawing Sheets

(56) References Cited

U.S. PATENT DOCUMENTS

| | | | |
|---|---|---|---|
| 2009/0235285 A1* | 9/2009 | Kim | G06F 17/30961 |
| | | | 719/328 |
| 2012/0047130 A1* | 2/2012 | Perez | G06F 8/34 |
| | | | 707/723 |
| 2013/0066921 A1* | 3/2013 | Mark | G06F 17/30734 |
| | | | 707/794 |
| 2013/0290366 A1 | 10/2013 | Boyle et al. | |
| 2014/0114805 A1 | 4/2014 | Akolkar et al. | |

OTHER PUBLICATIONS

Akkiraju et al., "Web Service Semantics—WSDL-S," W3C Member Submission, Nov. 2005, 8 pages, accessed Jul. 24, 2014. http://www.w3.org/2005/04/FSWS/Submissions/17/WSDL-S.htm.

Akolkar et al., "Interactive Acquisition of Remote Services," U.S. Appl. No. 13/890,969, filed May 9, 2013, 62 pages.

Domingue et al., "Web Service Modeling Ontology (WSMO)—An Ontology for Semantic Web Services," W3C Workshop on Frameworks for Semantics in Web Services, Jun. 2005, 5 pages, accessed Jul. 24, 2014. http://www.w3.org/2005/04/FSWS/Submissions/1/wsmo_position_paper.html.

Laredo et al., "Graph Based Data Model for Api Ecosystem Insights," U.S. Appl. No. 14/180,686, filed Feb. 14, 2014, 43 pages.

Martin et al., "OWL-S: Semantic Markup for Web Services," W3C Member Submission , Nov. 2004, 50 pages, accessed Jul. 24, 2014. http://www.w3.org/Submission/OWL-S/.

* cited by examiner

USING ONTOLOGY TO DISCOVER API REQUIREMENTS

BACKGROUND

Field of the Invention

The invention disclosed and claimed herein generally pertains to a method and system for discovering a missing API service capability. This is carried out using one or more ontologies that describe particular attributes and features of API service characteristics, in combination with an API data graph or other data structure.

Description of the Related Art

An application programming interface (API) specifies how certain software components should interact with each other. API as a service is a service platform that enables the creation and hosting of APIs. These APIs typically provide multiple entry points for API calls that are transmitted or exchanged in a format such as REST, XML web services or TCP/IP.

At present, APIs are available which have service features or capabilities that meet a number of different API user requirements. However, there can also be significant user requirements for which APIs have not yet been provided. It would be useful to have an enhanced approach for discovering or detecting API requirements of these types. API providers would then be better able to supply APIs that meet such requirements.

SUMMARY

Embodiments of the invention are able to discover one or more missing or unavailable API service capabilities, or API service characteristics that have certain desired features or attributes. This task is generally carried out using one or more ontologies that describe particular API service characteristics, in combination with an API graph or other data structure, as described hereinafter. Initially, a query term is provided that specifies one or more service features or attributes of an API service characteristic to be discovered. A discovery statement is then formulated from one or more query terms, and is compared with particular service features or attributes included in the data structure. The data structure is implied by an ontology for particular API service characteristics, and by an associated API graph that contains API usage and relationship data. An API having the requisite service characteristics is discovered, if data contained in a data structure which pertains to the API is found to match the discovery statement. Moreover, if a match cannot be found, it may be concluded that a desired API service feature is not available. Thus, embodiments of the invention provide API service ontologies that can be mined, to capture semantics indicating which features are missing.

An embodiment of the invention comprising a computer implemented method is provided for use in discovering a specified API service capability. The method includes generating a search statement related to the specified API service capability. The method further includes constructing a data structure, wherein the data structure includes one or more characteristic nodes that are each associated with data describing a particular API characteristic, and the associated data for respective characteristic nodes is arranged or ordered in accordance with one or more API service ontologies. The search statement is used to selectively search the data structure, and the method determines whether the search finds a match between data included in the statement, and particular ontological data associated with one or more of the characteristic nodes of the data structure.

DETAILED DESCRIPTION

Figure 1:
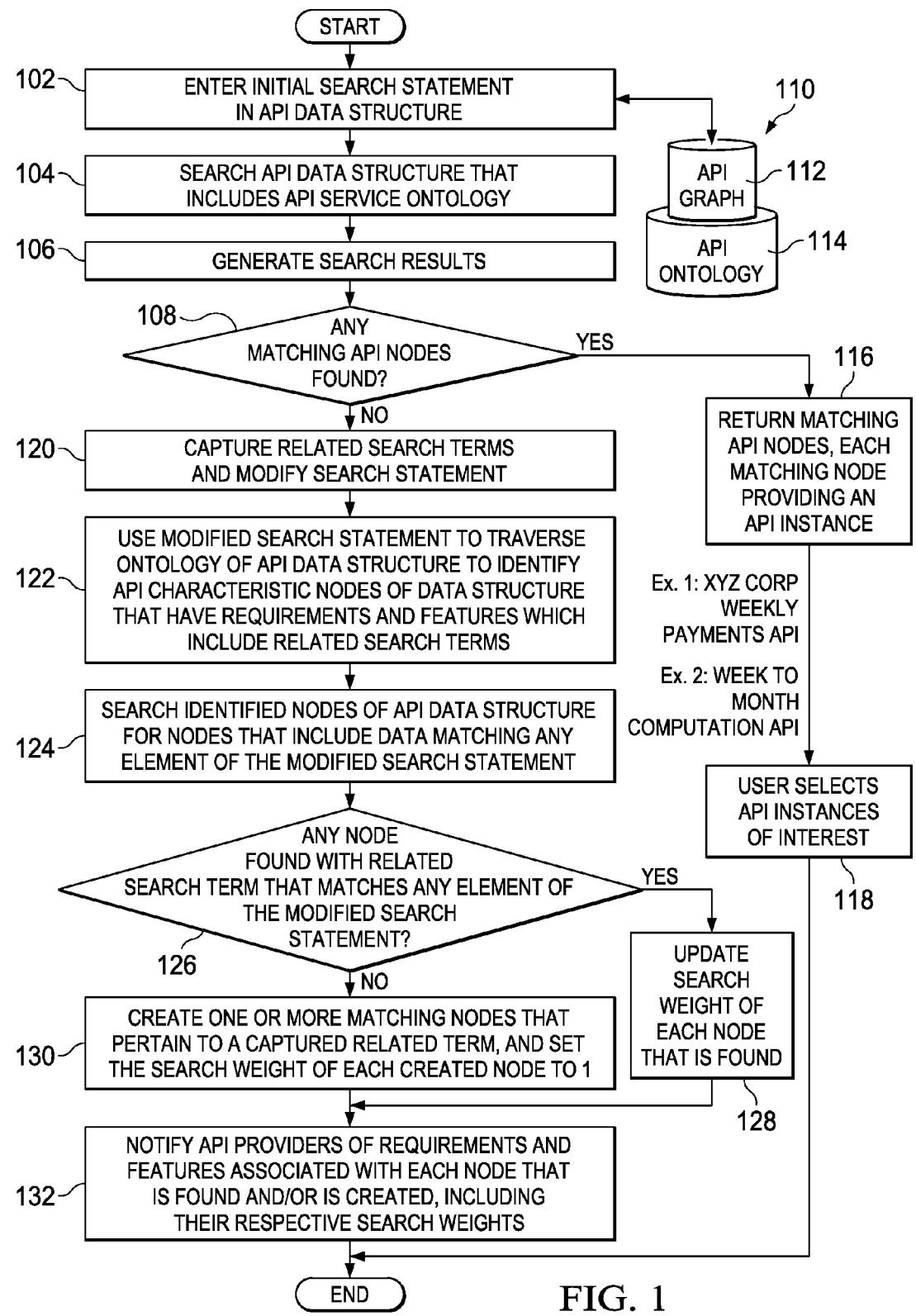
FIG. 1 is a flowchart showing steps for an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As is known by those of skill in the art, users or participants in an API ecosystem include API consumers, API providers, and providers of the API ecosystem. Generally, API providers will want to have a good understanding and knowledge of the needs and requirements of API consumers. This is essential to enable providers to supply API products having features that can meet respective API consumer requirements. Moreover, API providers must continually remain aware of trends and changes in desired API products. If this is not done, gaps can occur in the product offerings of an API vendor or provider. However, this continuing effort can be very challenging, in a rapidly changing and expanding API marketplace environment.

An embodiment of the invention provides an engine or other processing arrangement that recognizes gaps in a set or array of available API services, such as particular services provided to meet consumer API requirements as described above. In the embodiment, selected search terms are applied to a semantic model of the API services, to determine whether or not the model includes API features or attributes that match respective search terms.

The search terms are related to API requirements of a particular type or domain that an API user may have. The semantic model comprises one or more sets of terms that are also related to possible API service requirements or desired features of API users, wherein respective terms of a given set are arranged or organized in the form of an ontology, or ontological hierarchy. Thus, a failure to find a match between a search term and respective terms in the model can indicate a gap or deficiency in the API services that are currently available to a particular API consumer, or that are being supplied by a particular API provider. Moreover, the deficiency can be detected very readily, by searching or traversing the pertinent ontology of the semantic model.

The above capability to detect or recognize gaps in a set of API services can be used for a number of different purposes. One exemplary purpose pertains to an environment wherein an API provider has developed a set of API services, which are directed to a particular service ontology domain. Before the APIs are published, the above gap detection capability can be used to evaluate coverage of the API services, to make sure that APIs which provide certain features or requirements have not been overlooked.

As another example, the above capability to detect API gaps can be used to readily compare the product offerings of different API providers. Also, such capability can be used to assess the catalog of an API provider, to determine whether the catalog includes APIs having features that are currently in significant demand by API users, or are trending in that way.

As a further exemplary use, the gap detection capability could be used to mine the API marketplace for different industries, to generate API related maps for respective industries. API providers could use such maps to detect an industry in which API requirements were not being met, and thus indicating new product opportunities.

Referring to FIG. 1, there is shown a flowchart depicting steps of a method for an embodiment of the invention. At step 102 an initial search statement is entered into an API data structure, such as data structure 110. Data structure 110 comprises a particular combination of an API graph 112, and an API service ontology 114. The ontology 114 includes API service characteristics and features which are related to the entered search statement, and generally pertain to the same domain or subject as the search statement. The API graph 112 is a data structure that can contain extensive data pertaining to respective APIs of an API ecosystem or the like. Usefully, the API data structure includes nodes that are respectively associated with the same data as the ontology. Thus, the node data describes particular API service characteristics, features and requirements. An API graph 112 for use in constructing data structure 110, and its relationship to API ontology 114, is described hereinafter in further detail in connection with FIG. 2. This relationship effectively links usage of the API graph to a particular API ontology 114.

In another embodiment, the API data structure could comprise an API catalog, such as a catalog of products of an API provider.

An initial search statement for step 102 is usefully derived from one or more query terms, which pertain to a given area of activity or service. An example of a query term related to a given API could be an API service "To manage monthly payroll for a department". Language of this query term would then be used to formulate or construct a discovery statement or other initial search statement, which would be entered to search the data structure at step 102. In one embodiment of the invention, the discovery statement could be formulated using Structured Query Language (SQL), and would thus be an SQL statement. However, the invention is not limited thereto, and other searching languages could be used instead. Also, two or more query terms could be used to formulate a given discovery statement, or other search statement.

At step 104 the search statement is used to search the API service ontology 114, incorporated into data structure 110. The search statement, as shown by the above example, can comprise data in the form of a textual statement that has one or more distinct elements or portions. However, the search statement can comprise data in other forms as well. In carrying out the search of step 104, text (or other data) included in the search statement is compared with text (or other data) associated with each of selected nodes of the ontological data structure 110. This is done to identify nodes of the data structure which pertain to API characteristics and features that match those of the search statement.

A match clearly is found between the search statement and a given node, if the text or other data of the search statement, and that of the given node, are identical. However, in a useful embodiment a match may also be found, if a portion or particular element of the text in the search statement is discovered to be identical to the text of a given node. Moreover, a match may be found in some embodiments if text in the search statement is similar to text of a given node, to within a prespecified limit or criteria.

Results of the search are generated at step 106, and these results identify any nodes found to have API data that matches the search statement. Decision step 108 indicates whether or not any such nodes have been found.

If decision step 108 provides an affirmative response, the method of FIG. 1 proceeds to step 116. This step returns each matching API node that is found or discovered to an API user. Each matching node provides or indicates to the user an API instance that is closely related to the initial search statement, or to a portion or element thereof. FIG. 1 shows two illustrative examples of such API instances provided by matching nodes. More particularly, textual data of the two nodes is found to match respective portions of a search statement derived from a query for the above API service "to manage monthly payroll for a department".

Example 1 pertains to an API instance "Weekly payments," wherein the instance is made available by the API provider XYZ Corp. This instance is seen to be quite similar to an element or portion of the search statement, that is, to the element "monthly payroll." Both this element and Example 1 include the sub-element "pay". They both also include a term specifying periodicity, one using the term "monthly" and the other using the term "weekly".

Example 2 comprises the API instance "Week to month computation". This example is provided to illustrate a useful and significant capability that can be incorporated into an embodiment of the invention. More particularly, when a search is carried out at step 104, the search can be executed for both individual APIs of the ontological data structure, and also combinations or compositions of APIs that fulfill a prespecified goal. For example, if different elements of the search statement are each used to search the ontological data structure 110, they would traverse different nodes of the data structure and furnish different search results. These different results together provide a composite search result. API instances from the different searched nodes can then be used collectively, to achieve a goal set forth by the initial search statement. Thus, Examples 1 and 2 together provide API services for applying "Week to month computations" to "Weekly payments". This combination of services provides a result that is very similar to the element of the above search statement pertaining to "monthly payroll".

At step 118 the user selects the discovered API instances that are of interest. The method then ends.

Referring further to FIG. 1, if decision step 108 indicates that no matching API nodes were found, the method proceeds to step 120. This step first captures related search terms, that is, step 120 determines search terms that are related to one or more terms included in the initial search statement. As an example, the above exemplary search statement includes the term "payroll". Search terms related to this search term could include "salary"; "wages"; and "payments". More generally, by way of example and not limitation, related search terms could be captured or determined by use of a prespecified database having properties of a dictionary or thesaurus. Thus, a given term would be related to a textual element of the initial search statement, if the only difference of the given term was use of a word shown by the prespecified dictionary database to be synonymous to a word used in the textual element.

After capturing related search terms, step 120 modifies the initial search statement by inserting the related terms into the search statement, and removing prior search statement elements corresponding to related terms from the search statement.

At step 122, the modified search statement is used to traverse the ontology of data structure 110, in order to identify characteristic API nodes that have features or requirements which include or are described by any of the related search terms captured at step 120.

At step 124 the identified nodes, which each includes one or more captured related search terms, are searched to determine if any of such nodes include data that matches the modified search statement, or any element thereof. For example, a given identified API node could be directed to the service "manage monthly salaries". Since "salaries" is a captured related search term for "payroll", as noted above, the given identified node would include data matching an element of the modified search statement.

Decision step 126 determines whether or not there are any API nodes, with captured related search terms, that are found to match any element of the modified search statement. If this determination is affirmative, the method proceeds to step 128. Each such node that is found is an API instance that provides at least some of the API services being sought for by the initial search statement, even if such API instance is found under a different term or terms than those expressly set forth in the initial search statement. Accordingly, at step 128 the search weight of each API node found to match at step 126 is updated to indicate that it has a desired feature, or meets a requirement, of an API user. This information is furnished to API providers at step 132, and the method of FIG. 1 ends.

If decision step 126 indicates that no API node with a captured related search term can be found that matches the modified search statement or element thereof, the method proceeds to step 130. At this step, a user can carry out actions to create or affect API nodes that include captured related search terms, and thus provide matches with the search statement. These actions usefully include CRUD actions, that is, any action to create, read, update or delete data at a particular node of the API data structure.

As an example of such an action, "salary" and "payments" are related search terms to "payroll", as described above. Thus, a user at step 130 could create the API node "monthly salary payments". As a further example, a user at step 130 could create an API node that was a composition of the information of Examples 1 and 2, described above in connection with step 116. After creating a node at step 130, the search weight for the node is set to one.

Features of each node created at step 130, as well as nodes found at step 126, together with their respective search weights, are sent to API providers at step 132. This informs API providers of API service features and requirements for which there may be significant demand, and also that APIs to meet the demand may not yet be available.

Thus, the embodiment of the invention described in connection with FIG. 1 provides the capability, as referred to above, to detect or recognize gaps in a set of API services in a given domain. This capability can be used for respective purposes such as those described above, but is by no means limited thereto.

Figure 2:
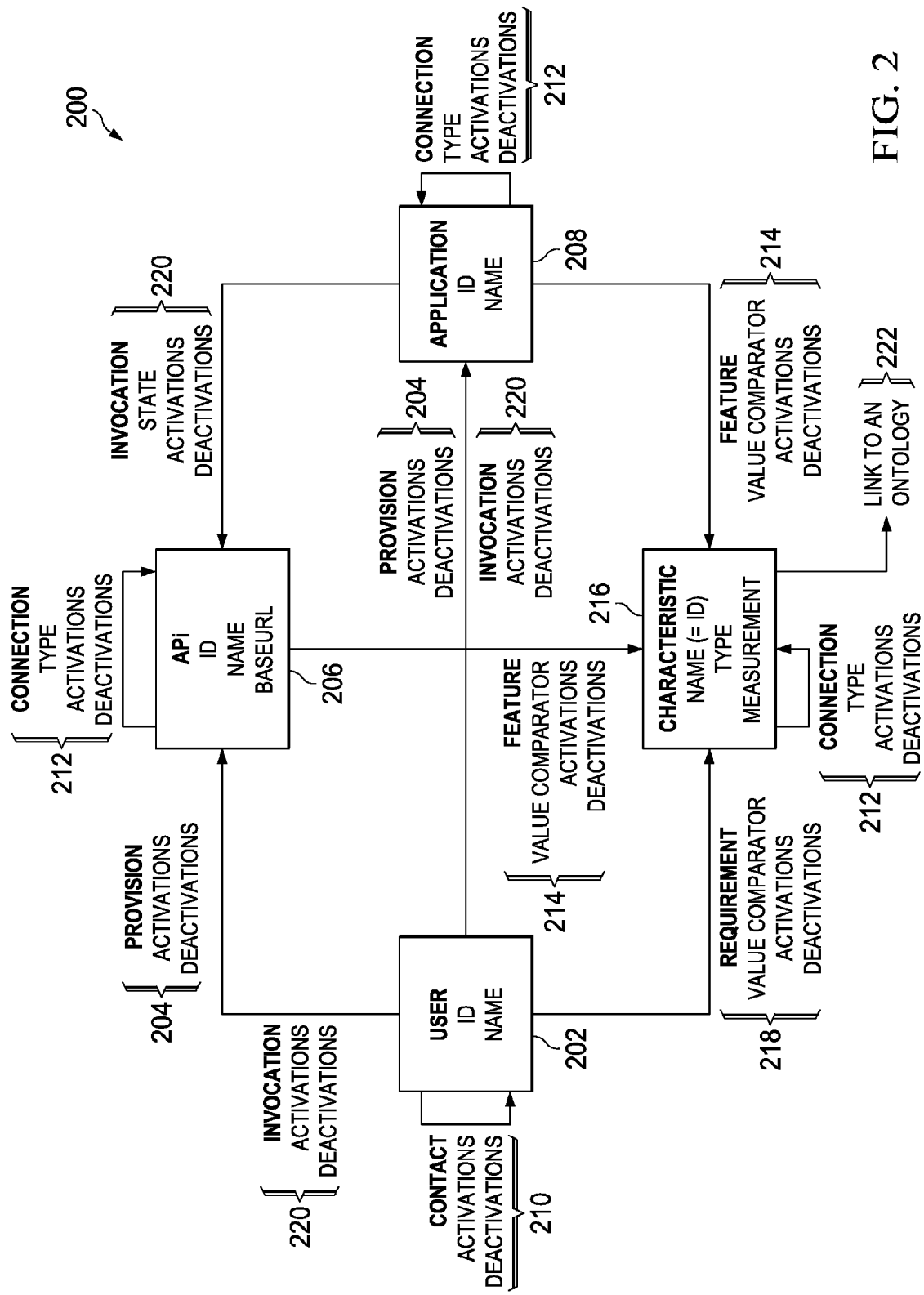
FIG. 2 is a block diagram illustrating an API graph for use with an embodiment of the invention.

Referring to FIG. 2, there is shown a unique data structure 200 for implementing an embodiment of the invention. More particularly, FIG. 2 shows an exemplary Web API graph core structure 200 that comprises a graph-based data model, which could serve as or be used to implement the API graph of FIG. 1. The API core graph 200 captures or collects data which pertains to respective entities included in an API ecosystem, and also pertains to relationships between such entities. Moreover, the API graph structure 200 of FIG. 2 collects data continually, and thus provides a means for continuously updating all pertinent data associated with an API ecosystem. This includes data regarding both API features and relationships, and usage thereof.

For embodiments as described above, the collected or captured data would include API service features and characteristics. Exemplary data of this type could be: Technical properties, e.g. latency; number of invocations and availability; Business properties: e.g., commercial uses, account required, and brand permission; User profile: e.g., freelancer, enterprise developer, startup, IDE used, target platform; Capabilities: e.g., tied to a particular ontology.

The API graph structure is extensible. That is, if elements such as new users, APIs or relationships are added to the API ecosystem, the graph structure 200 can be extended to represent these new elements. FIG. 2 further shows a link 222 connecting characteristic node 216 of API graph 200 to an ontology such as API ontology 114, as further described hereinafter. In addition, it is anticipated that an API ecosystem will change or evolve over time. Accordingly, an embodiment of the invention can include the capability of applying temporal or timing information to event data which is captured by the API graph of the data model, wherein the event data indicates changes of various types. A record of these changes thus captures the evolution of the API ecosystem over time.

FIG. 2 illustrates the nodes and relationships denoting the API graph structure 200. These elements are also used as the API graph extends, i.e., has additional nodes and relationships added to it. User node 202 of graph structure 200 represents humans or organizations that interact with a particular API ecosystem. User node 202 has provision relationships 204 or invocation relationships 220 to nodes 206 that represent APIs, or to application nodes 208. Depending on the existence of these relationships, users act either as API providers, API consumers, or both. Between user nodes 202, contact relationships 210 capture social structures, such as that users are friends, or follow the choices of each other. Application nodes 208, representing for example mash-ups (applications) in Programmable Web, also invoke API nodes 206. Both API and application nodes can have connection relationships 212 to denote, for example, dependencies to other APIs or applications.

API and application nodes may also have feature relationships 214 to characteristic nodes 216. Characteristic nodes 216 represent functionalities, including service functionalities, that are potentially shared among APIs or applications. For example, characteristic nodes 216 could represent categories like "social" or "location-based", data formats like "JSON" OR "XML", or qualities like "cost per request" or "availability". However, a characteristic node could also represent a service such as "Replacement Management" or "Merchandise Flow Management." The concrete value that an API 206 or application 208 has with regard to a characteristic node 216 is denoted in the properties or attributes of a feature relationship edge 214. User nodes 202 can have requirement relationship edges 218 to characteristic nodes 216 that (similar to feature relationships 214) capture quantitative information about the requirement.

To summarize the data storing capabilities of some of the node and edge elements of the API graph described above, when a user signs up to the associated Web API ecosystem, a corresponding node is posted to the API graph 200. When an API is registered to the API ecosystem, a corresponding node is likewise posted to the API graph. A provision relationship between the API node and the node representing the user is also created. Each endpoint of the API is also represented with a corresponding API node. Thus, it is seen that respective nodes and edges of the API graph, as illustrated by graph structure 200, provide a comprehensive repository for storing data that represents respective services entities, functions, conditions, states and changes of an associated API ecosystem.

In view of the above capabilities, API graph structure 200 can usefully be combined with API ontology 114, to implement data structure 110. As is known by those of skill in the art, a searchable ontology pertaining to a particular type, subject or domain comprises a number of classes or categories, arranged in a hierarchy. Information under each class is subdivided into properties or attributes. Accordingly, each service class of API ontology 114 could comprise one of the characteristic nodes 216 of FIG. 2. The attributes of a given class would then include the feature edges 214 and requirement edges 218 of the characteristic node 216 corresponding to the given class. In order to carry out the method of FIG. 1 by traversing or searching ontology 114, the search statement would be compared with data of respective characteristic nodes 216 of API graph structure 200, which were included in the API ontology 114. Thus, this arrangement illustrates the link between usage of data captured in the API graph 200 and an API ontology 114 or the like, as represented by link 222 of FIG. 2.

Figure 3:
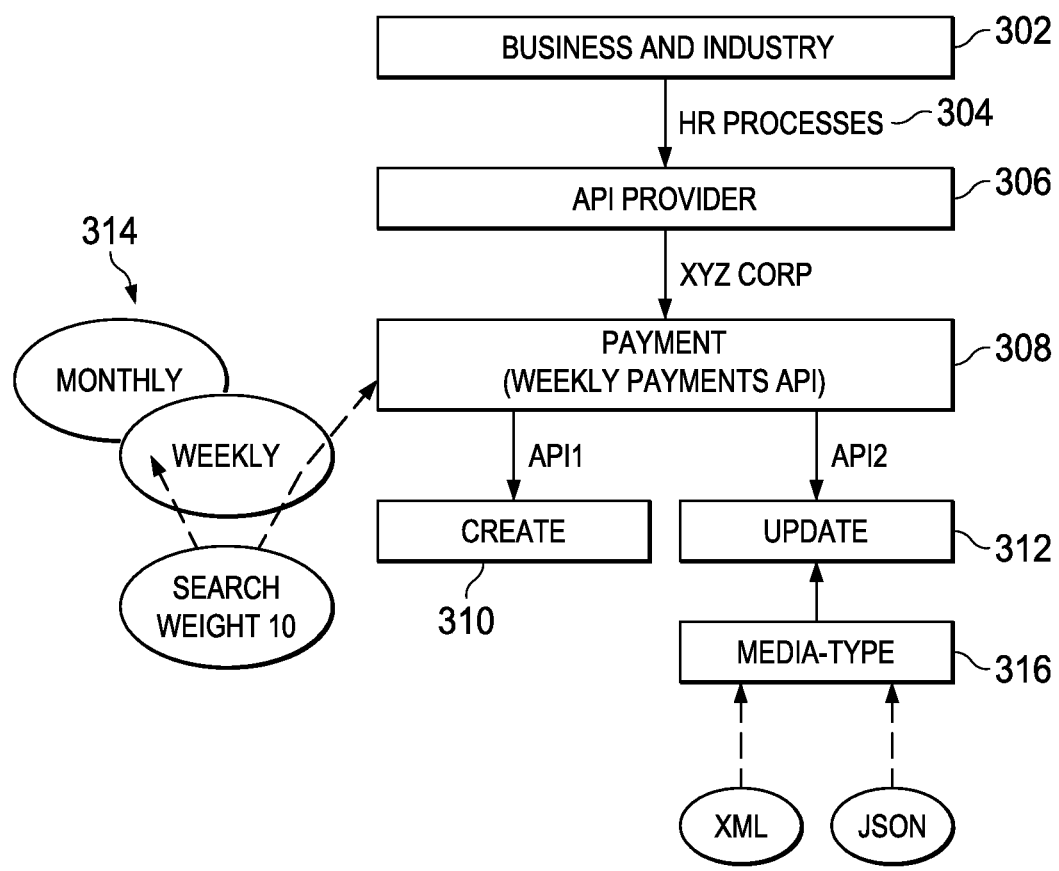
FIG. 3 is a schematic diagram illustrating use of an embodiment of the invention with an API ontology of a specified domain.

Referring to FIG. 3, there is shown a schematic representation which illustrates an API service ontology 302 used in connection with an embodiment of the invention. More particularly, the ontology 302 is used with a data structure 110 that includes API data graph 200. The ontology 302 of FIG. 3 is shown to comprise an API ontology in the Business and Industry domain. Respective classes, subclasses and further subdivisions of the ontology 302 respectively comprise, or are otherwise associated with, characteristic nodes 216 of data graph 200. Accordingly, a search term can be used to search or traverse API ontology 302, as described above in connection with the method of FIG. 1.

To further illustrate a search of the service ontology 302, the above statement "to manage monthly payroll for department" is again used as the initial search statement. When service ontology 302 is traversed using this term, the ontology class 304 is identified as being pertinent to management of department payrolls. This class is stated to be Human Resources (HR) Processes 304, and includes APIs from one or more API providers 306. As described above in connection with FIG. 1, one of the API providers is the XYZ Corp. As also described above, the term "payment" is found to be closely related to the search term "payroll". Thus, search of the class 304 will proceed to subclass 308 thereof, which is labeled "payment". Upon reaching this subclass, the search will become aware of the Weekly Payments API, referred to above as Example 1 and a product of XYZ Corp.

In the embodiment of FIG. 3, it may be determined that it is necessary to create an API 1 node, in order to provide an API instance which is closer to the search statement than the results found by going to subclass 308 in the search. This decision may be influenced by considering exemplary subclass attributes 314. Attributes 314 show that the Weekly Payments API instance has a search weight of 10, indicating that 10 users had previously searched for such instance.

If it is decided to carry out an action 310 to create a new API 1, this could be done by providing a composite of the Weekly Payments API and Example 2 of FIG. 1, that is, a Week to Months Computation API. API 1 could then be sent or posted to a storage location or the like, to update the contents thereof. This could be carried out by an action 312, and provide an API 2. API 2 could be put into the storage location, which can be accessed by means of media 316 comprising, for example, XML or JSON.

Figure 4A:
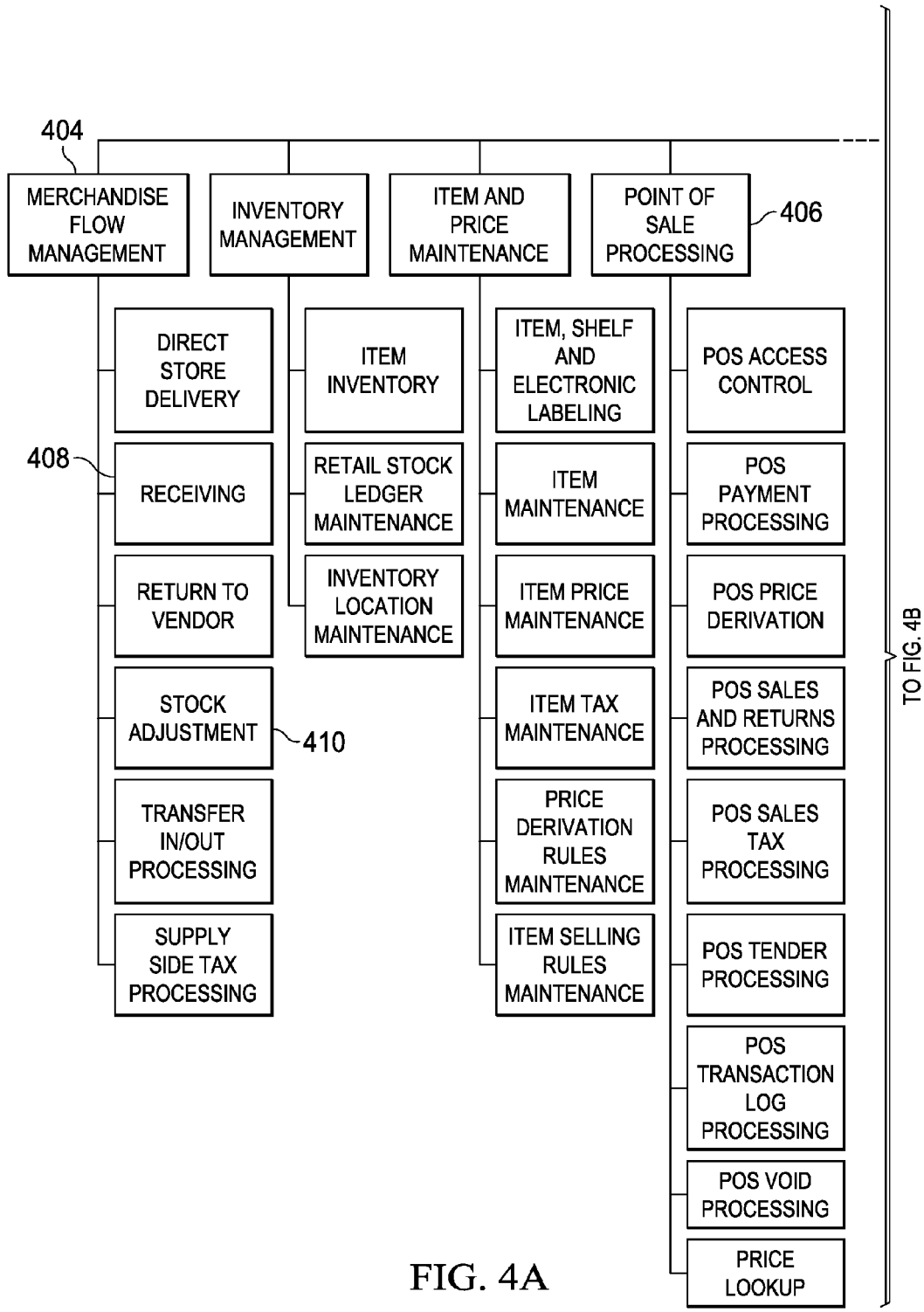
FIGS. 4A-4C together provide a schematic diagram showing an ontology for retail that can be used with an embodiment of the invention.
Figure 4B:
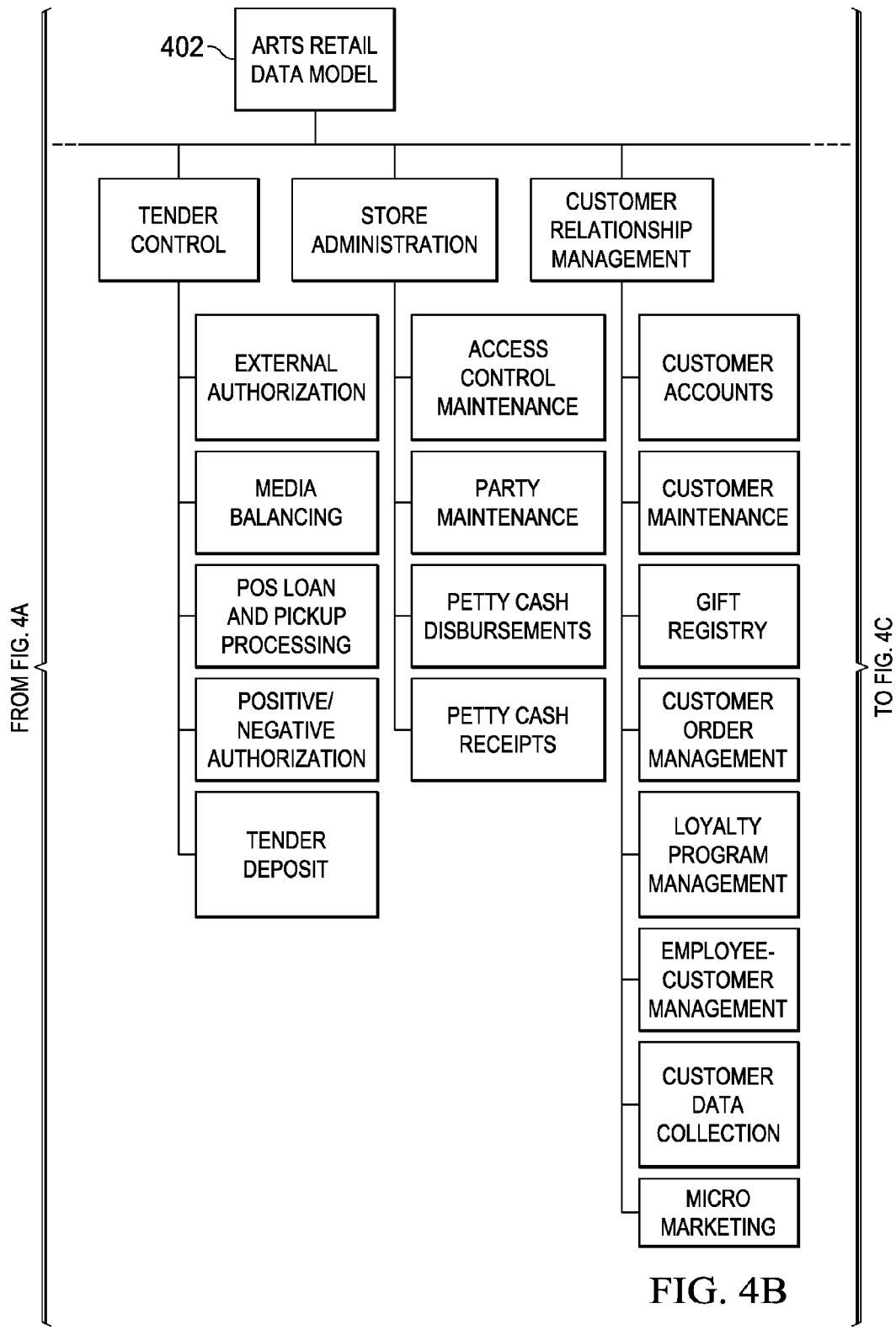
Figure 4C:
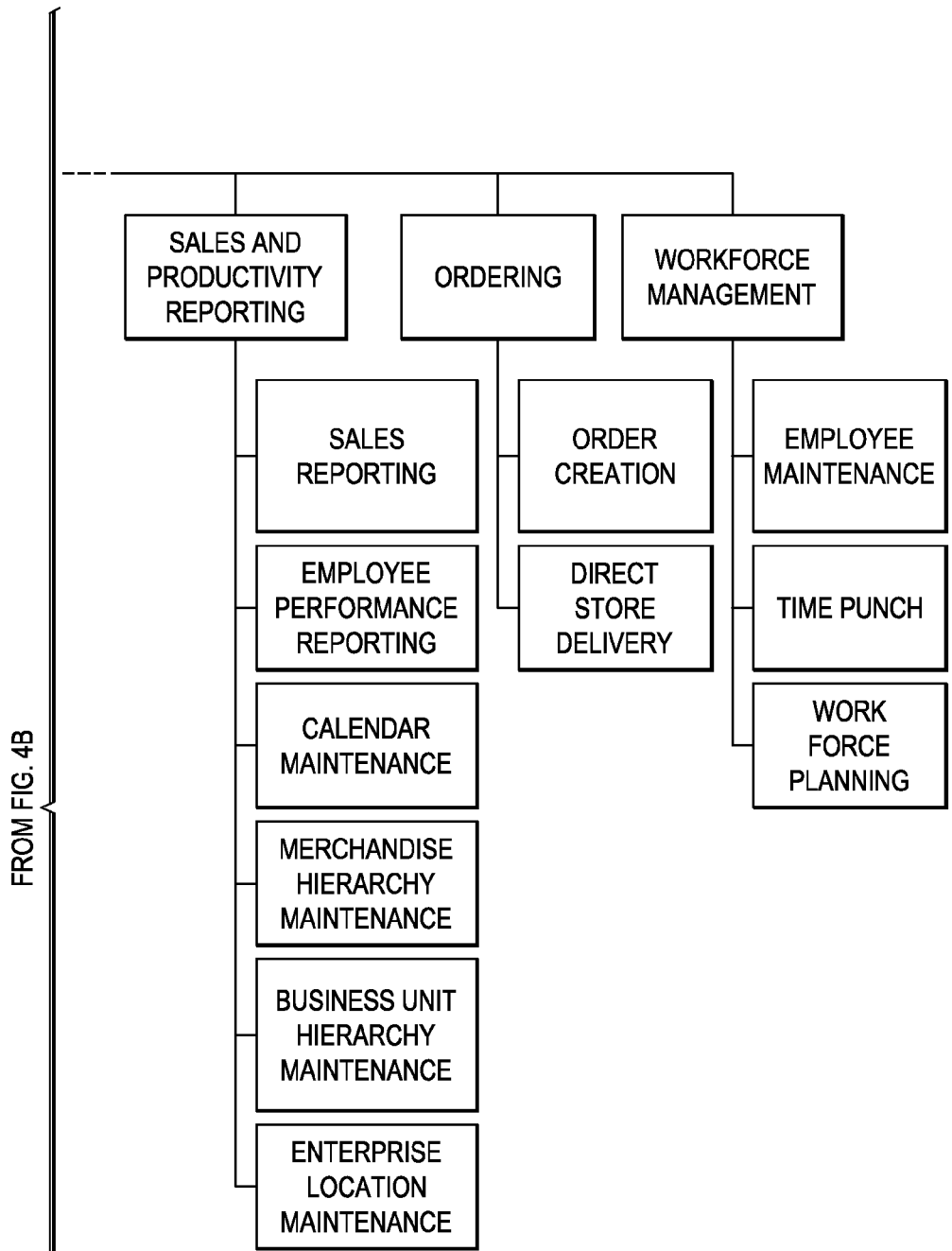

In an embodiment of the invention, the following Rules may be followed, in order to provide ontology elements of high quality design.
1. Use of natural language description for describing elements
    Check and validate descriptions
2. Full defined object—all necessary and sufficient conditions are entered for an object (e.g. for a class—relationships, properties or the like.
    Apply object completeness function (e.g. sum (properties)/no. of properties>threshold)
3. Maximum montholithic extendibility; new general terms can be included without requiring revision of existing ones
    Number of objects to be revised<threshold
4. Ontological distinction principle—no two classes are same (must be disjoint)
    Number of similar objects=0
5. Minimization of semantic distance between sibling concepts (similar concepts are grouped and represented using same primitives)
    Define similarity metric; Evaluate no. of similar siblings FIGS. 4A-4C collectively show an exemplary formal ontology 402 of a type that can be used in an embodiment of the invention. FIGS. 4A-4C more particularly show an ontology directed to APIs for retail services, which is provided by ARTS.

Ontology 402 includes classes exemplified by class 404, "merchandise flow management", and class 406, "point of sale processing". Class 404 has subclasses exemplified by subclass 408, "receiving", and 410, "Stock Adjustment".

Figure 5:
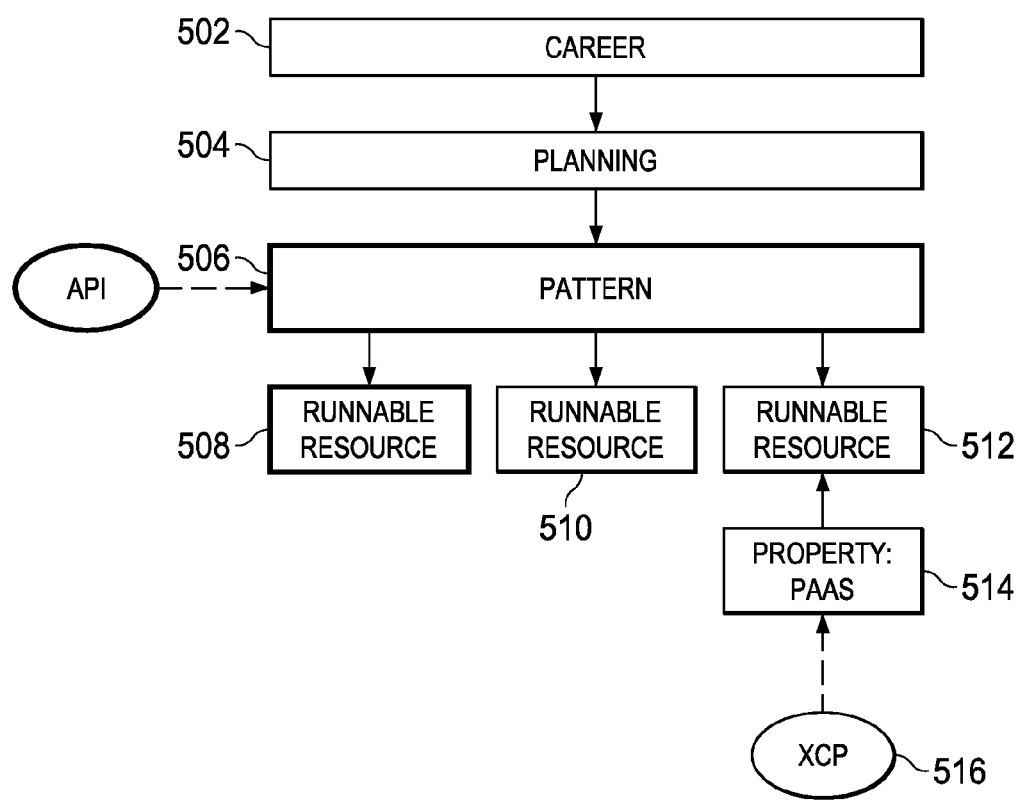
FIG. 5 is a schematic diagram illustrating traversal of an ontology in the implementation of an embodiment of the invention.

Referring to FIG. 5, there is shown a schematic representation of an API service ontology 502, which pertains to the domain of Careers. Ontology 502 can be used with the data structure 110, in like manner with ontology 302 described above. Ontology 502 includes a Planning class 504, which has a class value USA and a subclass 506, referenced as Pattern subclass 506. Subclass 506 is linked to runnable resources 508-512, wherein runnable resource 512 can be provided with properties by means of a Platform as a Service (PaaS) 514.

When ontology 502 is being traversed by implementation of an embodiment of the invention, the traversal will determine a given class, and then either returns the class or returns a null. If the given class is returned, the traversal then gets a property or attribute of that class, and either returns the property or a null. The traversal will also get a value of the class, if available.

As an example of traversing ontology 502 in accordance with an embodiment of the invention, as described above in connection with FIG. 1, the search statement would be "Plan college curriculum in USA". The ontology has a class "career planning" with the value USA. However, this class does not match the above search statement.

As a further example, the search statement is directed to class value "Career Planning API". A search of ontology 502 provides "career planning USA", but this does not match the desired class value.

As a third example, the ontology 502 is searched for a class having the property XCP (a type of cloud platform), in accordance with the search statement "Career Planning pattern for XCP". If the search is directed to runnable resource 508, the property XCP is missing from the career planning pattern class of the ontology. However, PaaS 514 provides the property XCP to the runnable resource 514.

Figure 6:
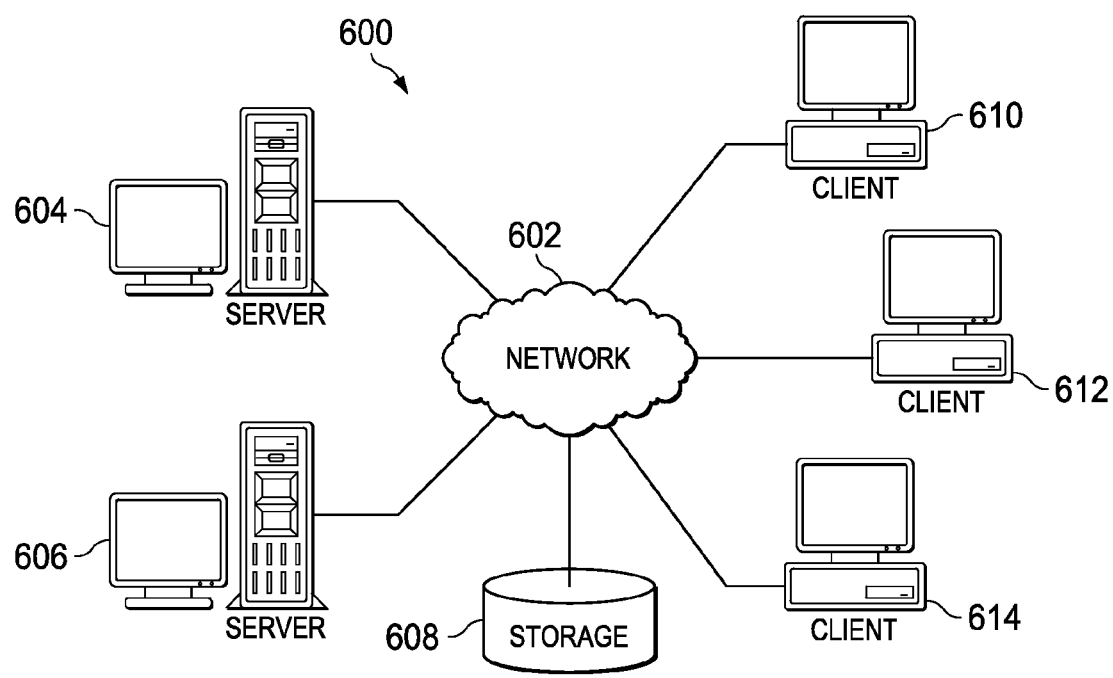
FIG. 6 is a block diagram showing a network of data processing systems in which an embodiment of the invention may be implemented.

FIG. 6 is a pictorial representation of a network of data processing systems in which illustrative embodiments of the invention may be implemented. Network data processing system 600 is a network of computers in which the illustrative embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server computer 604 and server computer 606 connect to network 602 along with storage unit 608. In addition, client computers 610, 612, and 614 connect to network 602. Client computers 610, 612, and 614 may be, for example, personal computers or network computers. In the depicted example, server computer 604 provides information, such as boot files, operating system images, and applications to client computers 610, 612, and 614. Client computers 610, 612, and 614 are clients to server computer 604 in this example. Network data processing system 600 may include additional server computers, client computers, and other devices not shown.

Program code located in network data processing system 600 may be stored on a computer-recordable storage medium and downloaded to a data processing system or other device for use. For example, program code may be stored on a computer-recordable storage medium on server computer 604 and downloaded to client computer 610 over network 602 for use on client computer 610.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 600 also may be implemented as a number of different types of networks, such as, for example, an intranet, a local area network (LAN), or a wide area network (WAN). FIG. 6 is intended as an example, and not as an architectural limitation for the different illustrative embodiments.

Figure 7:
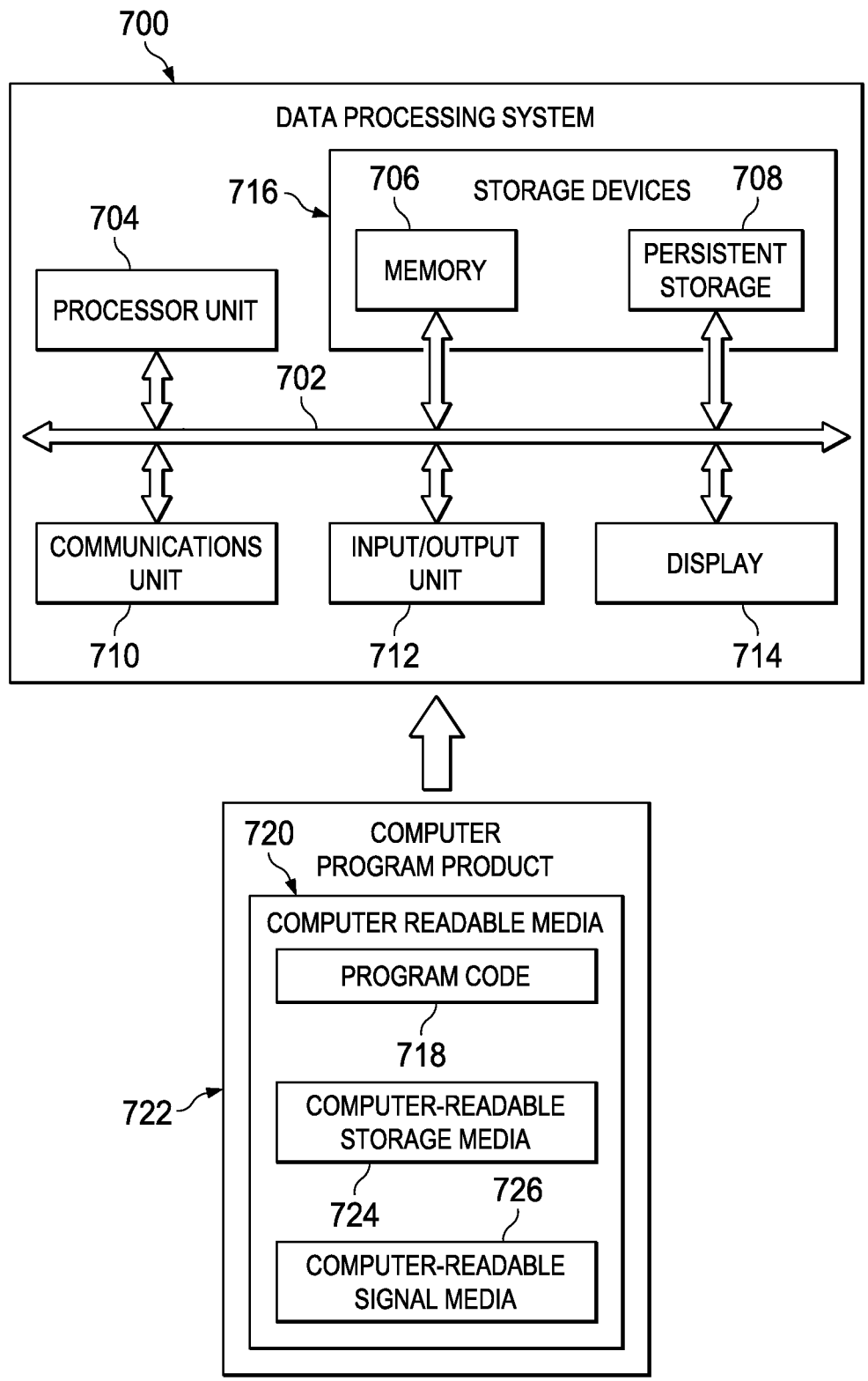
FIG. 7 is a block diagram showing a computer or data processing system that may be used in implementing embodiments of the invention.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for discovering a specified application programming interface (API) service capability, the computer-implemented method comprising:
   generating, by a computer, a search statement related to the specified API service capability;
   constructing, by the computer, a data structure in a computer readable storage medium, wherein the data structure includes characteristic nodes that are each associated with data describing a particular API characteristic, and wherein associated data for respective characteristic nodes is arranged in accordance with one or more API service ontologies;
   using, by the computer, the search statement to search the data structure;
   determining, by the computer, whether the search finds a match between data included in the search statement and particular ontological data associated with one or more of the characteristic nodes of the data structure representing API service capabilities;
   responsive to the computer determining that no match is found between the data included in the search statement and data associated with any characteristic node of the data structure, modifying, by the computer, the search statement by inserting one or more terms related to the specified API service capability not previously included in the search statement and removing from the search statement previously included search statement elements corresponding to the inserted one or more terms related to the specified API service capability;
   using, by the computer, the modified search statement to search the data structure to determine whether a match is found between data included in the modified search statement and the particular ontological data associated with the one or more of the characteristic nodes of the data structure;
   responsive to the computer finding no match between any data included in the modified search statement and data associated with any of the characteristic nodes, determining, by the computer, that the specified API service capability is not available and creating, by the computer, a new characteristic node in the data structure associated with selected data included in the modified search statement;
   setting, by the computer, a search weight for the new characteristic node to one, wherein the search weight indicates how many users previously searched for the specified API service capability; and
   notifying, by the computer, one or more API providers of the created new characteristic node, the search weight associated with the new characteristic node, and of the selected data included in the modified search statement to enable the one or more API providers to supply APIs with capabilities that meet API consumer requirements.

2. The computer-implemented method of claim 1, wherein searching the data structure comprises comparing data included in the search statement with ontological data associated with each of one or more of the characteristic nodes of the data structure.

3. The computer-implemented method of claim 1, wherein the search statement is derived from one or more query terms that respectively pertain to the specified API service capability.

4. The computer-implemented method of claim 3, wherein the search statement comprises a discovery statement that is formulated using a specified language and also using one or more of the query terms.

5. The computer-implemented method of claim 1, wherein the data structure comprises an API graph structure having nodes and edges, and wherein at least some of the nodes comprise characteristic nodes that have associated data arranged in accordance with one or more API service ontologies.

6. The computer-implemented method of claim 1, wherein a particular characteristic node of the data structure is associated with a given class of one of the API service ontologies, and wherein a given attribute of the given class comprises a particular class feature or requirement, and wherein the given attribute is represented by an edge of the data structure which is connected to the particular characteristic node.

7. The computer-implemented method of claim 1, wherein data included in the search statement comprises textual data.

8. The computer-implemented method of claim 1, further comprising:
responsive to the computer finding a match between the data included in the modified search statement and data associated with a particular characteristic node, updating, by the computer, the search weight of the particular characteristic node to indicate that the particular characteristic node has a user-desired API capability with how many users previously searched for the user-desired API capability.

9. The computer-implemented method of claim 1, wherein the search statement comprises multiple data elements, and wherein different data elements respectively provide different element search results, and wherein two or more element search results are combined to provide a composite search result.

10. A computer program product executable in a computer readable storage medium by a computer for discovering a specified application programming interface (API) service capability, the computer program product comprising:
instructions for generating a search statement related to the specified API service capability;
instructions for constructing a data structure in the computer readable storage medium, wherein the data structure includes characteristic nodes that are each associated with data describing a particular API characteristic, and wherein associated data for respective characteristic nodes is arranged in accordance with one or more API service ontologies;
instructions for using the search statement to search the data structure;
instructions for determining whether the search finds a match between data included in the search statement and particular ontological data associated with one or more of the characteristic nodes of the data structure representing API service capabilities;
instructions, responsive to determining that no match is found between the data included in the search statement and data associated with any characteristic node of the data structure, for modifying the search statement by inserting one or more terms related to the specified API service capability not previously included in the search statement and for removing from the search statement previously included search statement elements corresponding to the inserted one or more terms related to the specified API service capability;
instructions for using the modified search statement to search the data structure to determine whether a match is found between data included in the modified search statement and the particular ontological data associated with the one or more of the characteristic nodes of the data structure;
instructions, responsive to finding no match between any data included in the modified search statement and data associated with any of the characteristic nodes, for determining that the specified API service capability is not available and for creating a new characteristic node in the data structure associated with selected data included in the modified search statement;
instructions for setting a search weight for the new characteristic node to one, wherein the search weight indicates how many users previously searched for the specified API service capability; and
instructions for notifying one or more API providers of the created new characteristic node and of the selected data included in the modified search statement to enable the one or more API providers to supply APIs with capabilities that meet API consumer requirements.

11. The computer program product of claim 10, wherein the data structure comprises an API graph structure having nodes and edges, and wherein at least some of the nodes comprise characteristic nodes that have associated data in accordance with one or more API service ontologies.

12. The computer program product of claim 10, wherein a particular characteristic node of the data structure is associated with a given class of one of the API service ontologies, and wherein a given attribute of the given class comprises a particular class feature or requirement, and wherein the given attribute is represented by an edge of the data structure which is connected to the particular characteristic node.

13. The computer program product of claim 10, wherein data included in the search statement comprises textual data.

14. The computer program product of claim 10, further comprising:
instructions, responsive to finding a match between the data included in the modified search statement and data associated with a particular characteristic node, for updating the search weight of the particular characteristic node to indicate that the particular characteristic node has a user-desired API capability with how many users previously searched for the user-desired API capability.

15. A computer system for discovering a specified application programming interface (API) service capability, the computer system comprising:
a bus;
a computer readable storage medium connected to the bus, wherein program code is stored on the computer readable storage medium; and
a processor unit connected to the bus, wherein the processor unit executes the program code:
to generate a search statement related to the specified API service capability;
to construct a data structure in the computer readable storage medium, wherein the data structure includes characteristic nodes that are each associated with data describing a particular API characteristic, and wherein associated data for respective characteristic nodes is arranged in accordance with one or more API service ontologies;
to use the search statement to search the data structure;

to determine whether the search finds a match between data included in the search statement and particular ontological data associated with one or more of the characteristic nodes of the data structure representing API service capabilities;

to modify the search statement by inserting one or more terms related to the specified API service capability not previously included in the search statement and removing from the search statement previously included search statement elements corresponding to the inserted one or more terms related to the specified API service capability in response to determining that no match is found between the data included in the search statement and data associated with any characteristic node of the data structure;

to use the modified search statement to search the data structure to determine whether a match is found between data included in the modified search statement and the particular ontological data associated with the one or more of the characteristic nodes of the data structure;

to determine that the specified API service capability is not available and to create a new characteristic node in the data structure associated with selected data included in the modified search statement in response to finding no match between any data included in the modified search statement and data associated with any of the characteristic nodes;

to set a search weight for the new characteristic node to one, wherein the search weight indicates how many users previously searched for the specified API service capability; and to notify one or more API providers of the created new characteristic node and of the selected data included in the modified search statement to enable the one or more API providers to supply APIs with capabilities that meet API consumer requirements.

* * * * *